(12) United States Patent
Holemans

(10) Patent No.: US 6,227,493 B1
(45) Date of Patent: May 8, 2001

(54) REUSABLE, SEPARABLE, STRUCTURAL CONNECTOR ASSEMBLY

(75) Inventor: Walter Holemans, Washington, DC (US)

(73) Assignee: Planetary Systems Corporation, Silver Springs, MD (US)

(*) Notice: Subject to any disclaimer, the term of this patent is extended or adjusted under 35 U.S.C. 154(b) by 0 days.

(21) Appl. No.: 09/287,038

(22) Filed: Apr. 6, 1999

(51) Int. Cl.[7] ..................................................... B64G 1/22
(52) U.S. Cl. ....................... 244/158 R; 244/161; 285/81; 285/82; 285/315; 285/316
(58) Field of Search ........................ 102/377, 378; 244/158 R, 161; 285/81, 82, 315, 316

(56) References Cited

U.S. PATENT DOCUMENTS

| | | | |
|---|---|---|---|
| 865,498 | * 9/1907 | Kenyon | 285/322 |
| 2,159,150 | * 5/1939 | Heintz | 285/315 |
| 3,420,470 | * 1/1969 | Meyer | 244/158 R |
| 3,424,403 | * 1/1969 | Hull . | |
| 4,381,583 | * 5/1983 | von Tiesenhausen . | |
| 4,540,873 | 9/1985 | Kester | 219/200 |
| 4,685,376 | 8/1987 | Noel et al. | 89/1.14 |
| 4,715,565 | 12/1987 | Wittmann | 244/158 R |
| 4,790,571 | * 12/1988 | Montanari et al. | 285/86 |
| 4,905,938 | * 3/1990 | Braccio et al. | 244/161 |
| 5,125,601 | * 6/1992 | Monford, Jr. | 244/161 |
| 5,197,695 | * 3/1993 | Anderson et al. | 244/129.1 |
| 5,390,606 | 2/1995 | Harris | 102/378 |
| 5,735,626 | * 4/1998 | Khatiblou et al. | 403/16 |

FOREIGN PATENT DOCUMENTS

0488872 * 6/1992 (EP) .

* cited by examiner

Primary Examiner—Peter M. Poon
Assistant Examiner—Kevin Jakel
(74) Attorney, Agent, or Firm—Robert M. McDermott

(57) ABSTRACT

An easy to use, and reuse, separation connector is disclosed that comprises a first component having a plurality of leaf elements with protrusions, and a second component having a recess for receiving the leaf element protrusions. The protrusions of the leaf elements are secured within the recess by a tensioned band; the protrusions and recess are formed so as to provide an efficient and effective load and torque bearing surface that requires minimal tension on the tensioned band. In a preferred embodiment, the tensioned band is detensioned by a thermal device that melts the band. When the band is melted, springs or other devices urge the leaves away from the mating surface, thereby allowing for the separation of the connected items.

37 Claims, 8 Drawing Sheets

FIG. 1 [Prior Art]

Section View I

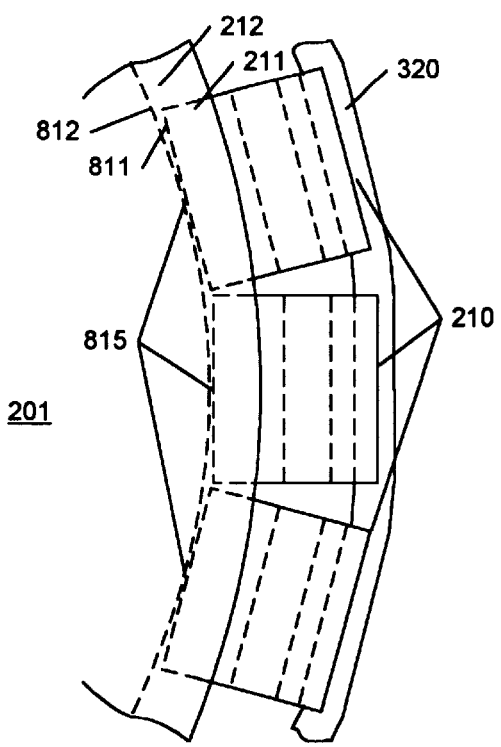
FIG. 8A
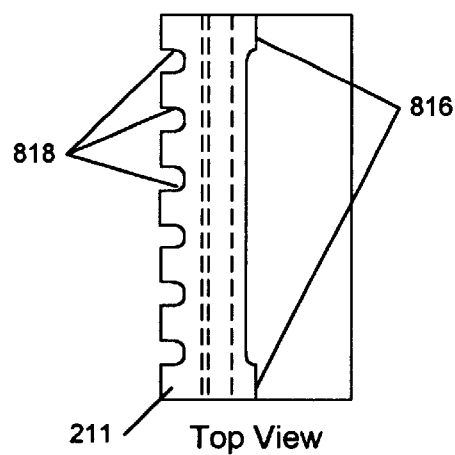
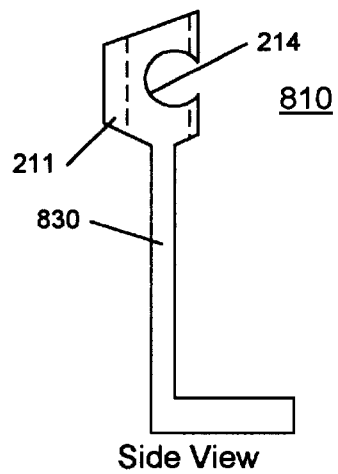
FIG. 8C
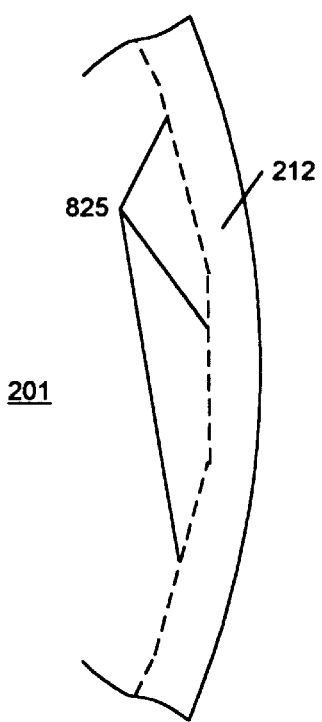
FIG. 8B
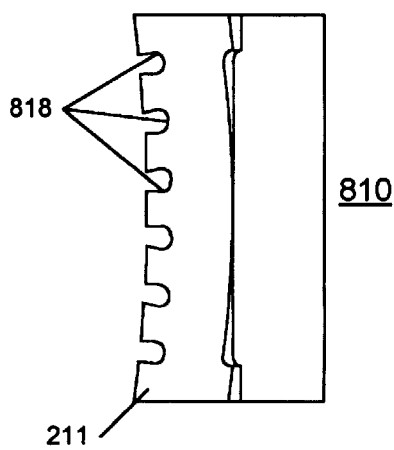
FIG. 8D

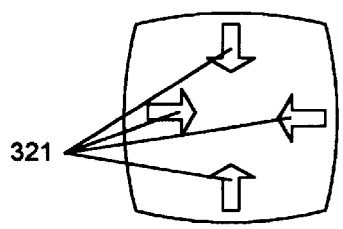
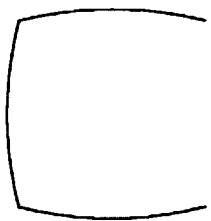
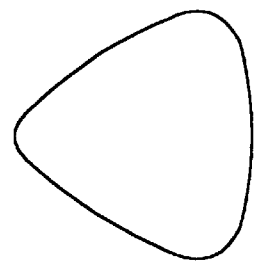
FIG. 10A　　　FIG. 10B　　　FIG. 10C
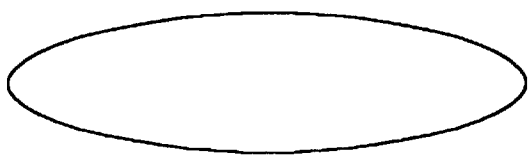
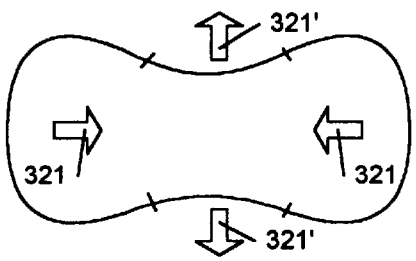
FIG. 10D　　　FIG. 10E
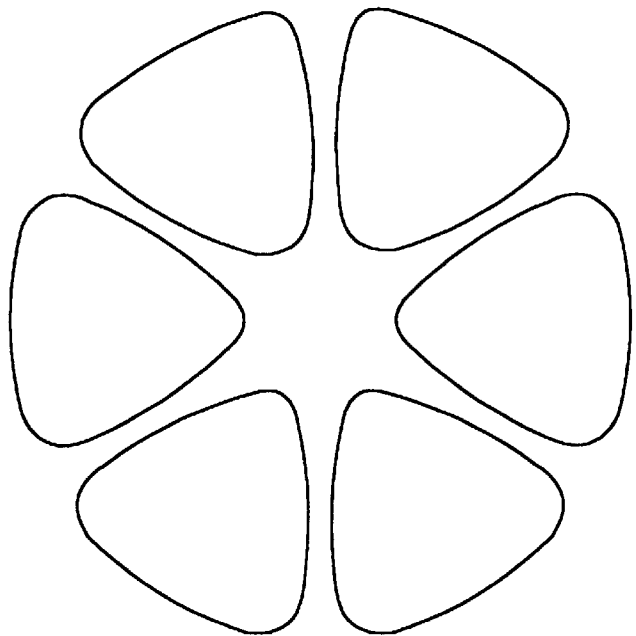
FIG. 10F

_US 6,227,493 B1_

REUSABLE, SEPARABLE, STRUCTURAL CONNECTOR ASSEMBLY

BACKGROUND OF THE INVENTION

1. Field of the Invention

This invention relates to the field of mechanical connectors, and in particular to connector assemblies for stage separation systems, such as satellite and missile systems.

2. Description of Related Art

Transport systems, such as rockets that transport satellites into space, vessels that transport submerged sections of ocean structures such as oil platforms, and the like, require a means for securely fastening different items together for transport, and reliably and easily unfastening the items for deployment. Multi-stage rockets also require a means for fastening the stages together, and reliably unfastening the stages as each stage is spent. In other situations, such as aircraft carrier based aircraft, the items are transported or stored in a disassembled state and require a means for rapidly fastening the items for deployment, and reliably and easily unfastening the items for subsequent storage or transport.

A variety of devices have been developed to secure two items together while also allowing the items to be separated quickly and reliably. In the aerospace industry, the common connection devices include bolts and bands that can be severed. Bolts are used to fasten the two items together, and an explosive charge is typically used to sever the bolts at the proper time, thereby unfastening the two items. Depending upon the application, ancillary devices such as springs may be used to urge the two items apart when the bolts are severed. To assure a reliable separation, the number of bolts used to fasten the two items is kept to a minimum; this results in load points at the bolts far in excess of the load imposed by a distributed fastening system.

Belt structures are commonly used to provide for a distributed load. A belt structure that is commonly employed to fasten items together is a "V-band", typified by U.S. Pat. No. 4,715,565, incorporated by reference herein. The V-band includes a tension belt for securing a plurality of retainers against camming surfaces on flange members on separable spacecraft component parts.

A typical V-band embodiment consists of an upper ring attached to the payload, a lower ring attached to the launch vehicle, and a clampband that is circumferentially tensioned to the flanges of the upper and lower rings, as illustrated in FIG. 1. The upper ring 101 and lower ring 102 each have flanges that, when joined, form a "V" shaped projection 1 50A. The clampband consists of a belt 110 and a plurality of clamps 120. Each of the clamps 120 have a recess 150B corresponding to the shape of the projection 150A of the upper 101 and lower 102 rings. When the belt 110 is tensioned, the recesses 150B of the clamps 120 are compressed against the projections 150A, thereby securing the upper 101 and lower 102 rings together.

The belt 110 is conventionally tensioned by bolts (not shown) that are in line with the belt 110, and explosive bolt cutters are used to sever the bolts to release the tension. When the tension in the belt 110 is released, the clamps 120 are free to separate from the projection 150A, thereby decoupling the upper 101 and lower 102 rings. The conventional V band structure also includes means, such as springs, for urging the clamps 120 apart from the projection 150A, to provide for a reliable separation. Means are also provided to retain the belt 110 and clamps 120 after separation, to minimize the occurrence of "space junk".

For V-bands to work properly, the tension required in the tensioning belt 110 is relatively high (about 3800 pounds for a 38 inch diameter; 6800 pounds for a 66 inch diameter). This high tension requires radial stiffeners in the rings 101, 102. The sudden release of this stored energy generates high shock, and imposes additional requirements on the means used to retain the fast moving belt and clamps after separation. Because of the high tension requirements, the combined weight of the belt, clamps, and ancillary required devices is substantial (as much as 25 pounds for a 38 inch diameter V-band structure). The high tension requirements of V-bands often require specialized tools and instruments to tension the band. The high tension and high release shock effects also limits the reliable life of the components, thereby limiting the amount of testing that can be applied to the components that are actually flown.

Another structure that is commonly used to provide for an easily separable connection is an explosive frangible joint, as typified by U.S. Pat. Nos. 4,685,376 and 5,390,606. An explosive detonating cord is placed within a contained space that forms the frangible joint between the two items. Separation is achieved by detonating the cord within the contained space, forcing a rapid crack propagation through the frangible joint. Although the weight of an explosive frangible joint is less than that of an equivalent sized V-band, it is still substantial (as much as 17 pounds for a 38 inch diameter joint). The destructive nature of this separation system precludes testing of the joints that are actually flown.

Each of the aforementioned separation connectors also imparts a substantial shock to the connected items upon separation, and the explosive nature of the devices used for separation introduce a risk of personal injury, particularly during pre-launch assembly and testing. Because of the shock effects, such separation connectors are not commonly used on items that are routinely disassembled for storage or transport.

BRIEF SUMMARY OF THE INVENTION

It is an object of this invention to provide a separation connector that is light weight. It is a further object of this invention to provide a separation connector that allows for repeated testing. It is a further object of this invention to provide a separation connector that allows for separation with minimal shock effects. It is a further object of this invention to provide a method for connecting components that is simple, secure, and reliable. It is a further object of this invention to provide a connector component that is stiff, strong, and easy to use.

These objects and others are achieved by a separation connector that comprises a plurality of leaves with leaf lips that are secured within a mating surface by a tensioned band. The leaves and mating surface are designed such that the tension required on the tensioned band is significantly less than the tension required on a V-band. In a preferred embodiment, the tensioned band is detensioned by a thermal device that melts, decomposes, or severs the band. When the band is detensioned, springs urge the leaves away from the mating surface, thereby allowing for the separation of the connected items.

BRIEF DESCRIPTION OF THE DRAWINGS

The invention is explained in further detail, and by way of example, with reference to the accompanying drawings wherein:

FIGS. 8A–8D illustrate an example embodiment of a leaf element of a separation connector in accordance with this invention.

FIGS. 10A–10F illustrate example alternative configurations of the leaf elements of separation connectors in accordance with this invention.

DETAILED DESCRIPTION OF THE INVENTION

Figure 1:
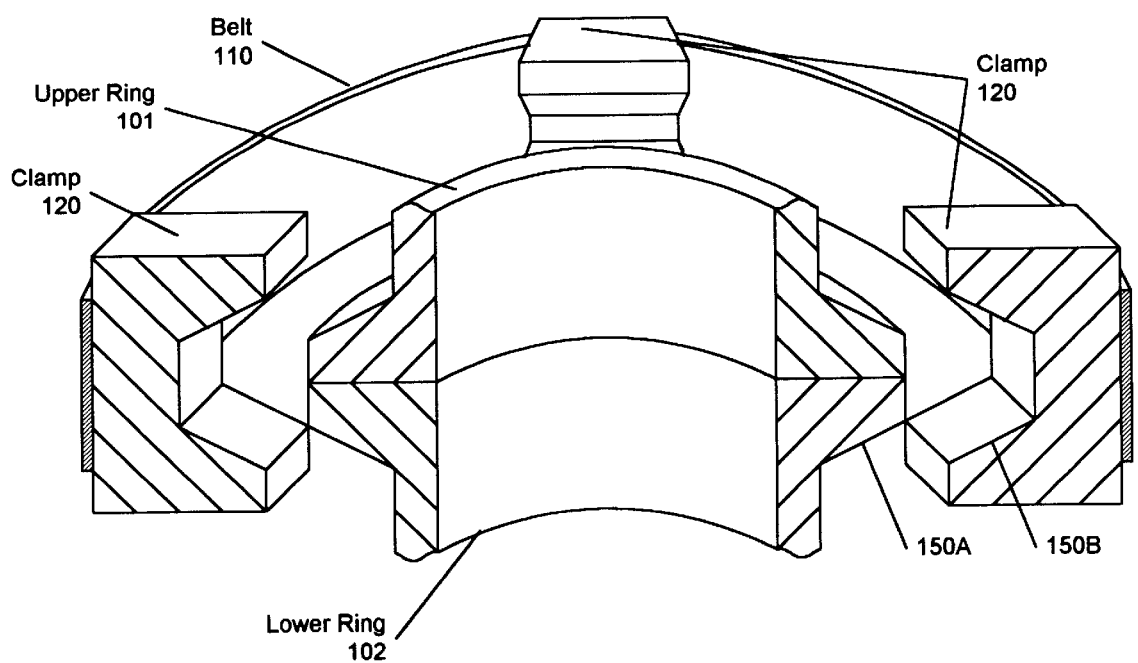
FIG. 1 illustrates an example prior art V-band separation connector.
Figure 2:
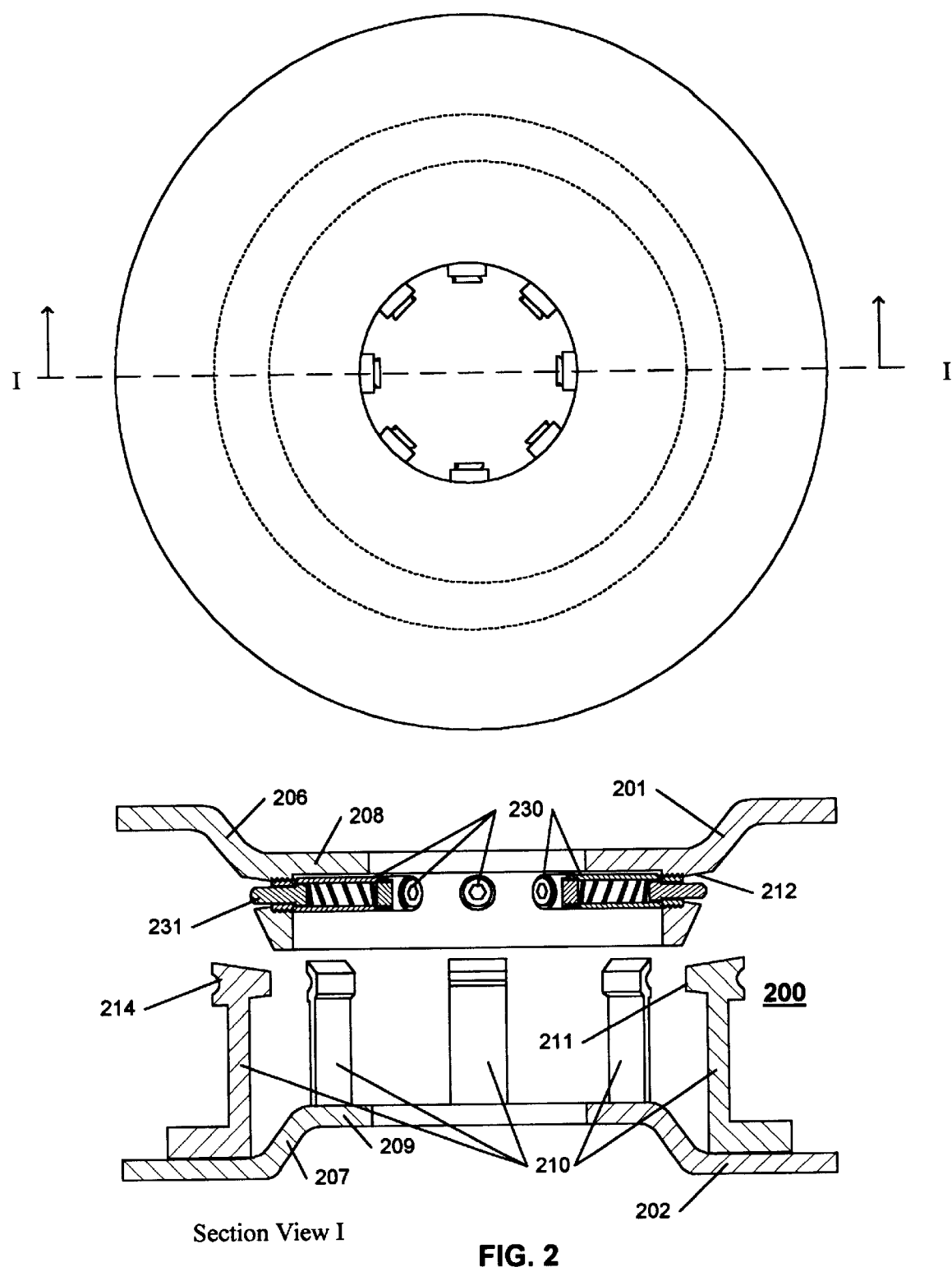
FIG. 2 illustrates an example separation connector in accordance with this invention.
Figure 4:
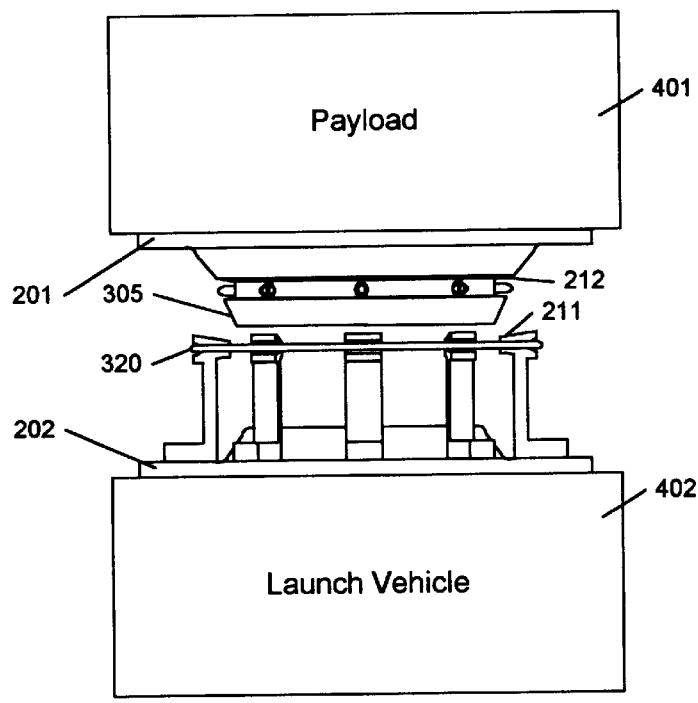
FIG. 4 illustrates an example vehicle coupling system in accordance with this invention.

FIG. 2 illustrates an example separation connector 200 for connecting an upper ring 201 and lower ring 202 in accordance with this invention. For ease of understanding, the invention is presented in the context of an aerospace transport system; other applications will be evident to one of ordinary skill in the art in view of the principles presented herein. The upper 201 and lower 202 rings are typically fastened to the items being connected (401, 402 in FIG. 4), such as a launch vehicle and satellite. Alternatively, the upper 201 and lower 202 rings may be an integral part of the items being connected. As used herein, the terms "upper", "lower", and "rings" are used for ease of reference and understanding. Alternative arrangements, configurations, and orientations will be evident to one of ordinary skill in the art, in view of the principles of the invention presented herein.

The example separation connector 200 includes leaf elements 210 secured to the lower ring 202 that each have a leaf lip 211 that conforms to a recess 212 in the upper ring 201. The leaf elements 210 also include a filament groove 214 that is used to position a filament (320 in FIG. 3D) about a perimeter formed by the leaf lips 211. As discussed below, the leaf elements 210 are typically circularly arranged, although other arrangements may be used to conform to alternatively shaped connected items. An eight leaf configuration is illustrated in FIG. 2 for clarity, although additional leaf elements may be employed. For example, a preferred embodiment for Athena, Atlas, Delta, Pegasus, and other launch vehicles, uses 59 leaf elements 210 for a 38 inch diameter upper 201 and lower 202 ring design. Also illustrated in FIG. 2 are eight spring elements 230 with plungers 231 whose function is detailed below; in a preferred embodiment, two spring elements 230 are provided per leaf element 210. In a preferred embodiment of this invention, the upper 201 and lower 202 rings are radially stiffened by introducing a circumferential step 206, 207 in each. In the upper 201 and lower 202 rings, the stepped surfaces 208, 209 serve as the mounting surface for ancillary devices, such as the spring elements 230 and other devices discussed further herein.

Figure 3A:
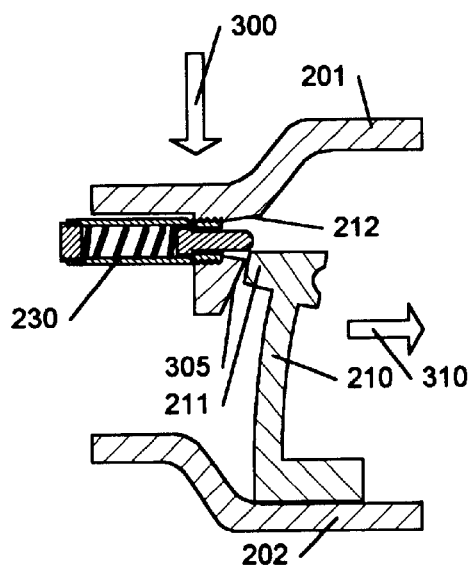
FIGS. 3A–3D illustrate the coupling of two items via an example separation connector in accordance with this invention.
Figure 3B:
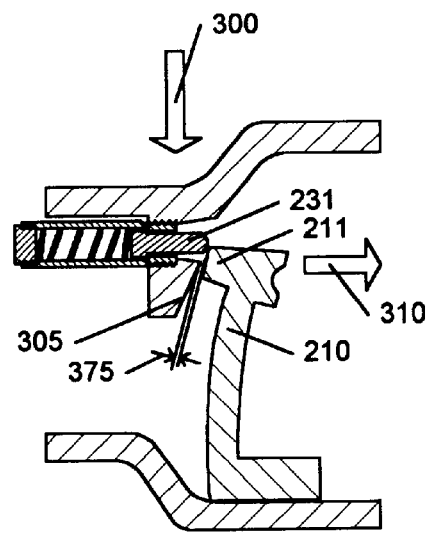
Figure 3C:
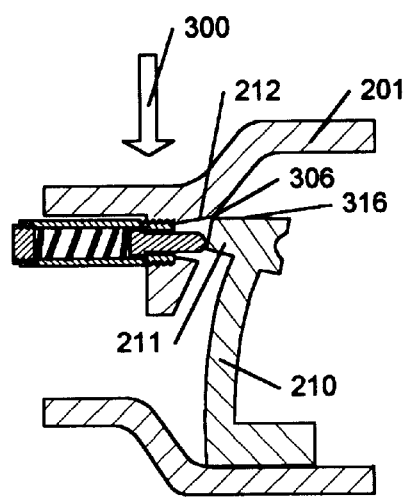
Figure 3D:
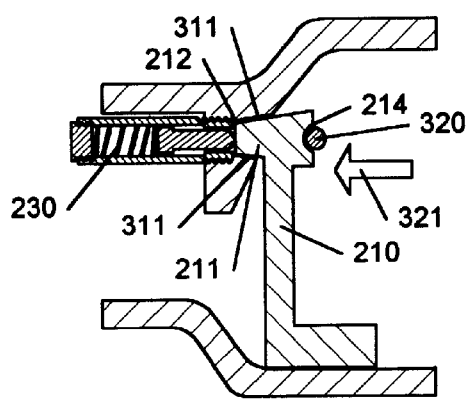

FIGS. 3A–3D illustrate a detailed view of the operation of the separation connector 200 for connecting the upper 201 and lower 202 rings. In FIG. 3A, the upper ring 201 is urged 300 into the leaf elements 210 of the lower ring 202. In accordance with one aspect of this invention, the leaf elements 210 are arranged so that the unbiased position of the leaf lips 211 conform to the location of the recess 212 in the upper ring 201; that is, in a preferred embodiment, when the leaf lip 211 is seated in the recess 212, the leaf element 210 is in a substantially unbiased and unstressed position. The upper ring 201 is shaped to provide an inclined perimeter surface 305 that deforms the leaf elements 210 outward 310 as the upper ring 201 is urged 300 into the leaf elements 210.

FIG. 3B illustrates the result of further downward urging 300 on the upper ring 201. The spring element 230 is designed to exert a force, via the plunger 231, that is larger than the resilient inward force exerted by the resilience of the deformed leaf element 210. That is, the spring element 230 and plunger 231 are designed such that the urging 300 of the upper ring 201 into the leaf elements 210 continues to deform the leaf element 210 outward 310.

FIG. 3C illustrates the result of further downward urging 300 on the upper ring 201. In a preferred embodiment, the leaf element 210 is designed to provide a surface 316 that operates in conjunction with a surface 306 on the upper ring 201 to resist downward movement of the upper ring 201 when the leaf lip 211 of the leaf element 210 is adjacent the matching recess 212 in the upper ring 201.

In accordance with this invention, a circumferential band or filament 320 is placed in the filament groove 214 of the leaf element 210, and tensioned to exert an inward force 321 to urge the leaf lips 211 of the leaf elements 210 into the conforming recess 212 in the upper ring 201. In a preferred embodiment of this invention, the filament 320 is a polymer having a high strength and stifffiess to weight ratio, such as KEVLART™ (Dupont) or VECTRAN™ (Hoechst Celanese). It is significant to note that the tension of the filament 320 need only overcome the aforementioned force of the springs 230 in order to urge the leaf lips 211 into the recess 212. For improved load bearing potential, the filament 320 is further tensioned, as discussed below. It is also significant to note that in the tensioned position of FIG. 3D, the leaf elements 210 are in their substantially unstressed, non-deformed, positions, thereby providing near maximum load bearing potential. The leaf lip 211 of each leaf element 210 and the recess 212 of the upper ring 201 are designed to conform as closely as practical, thereby distributing the potential compression and expansion loads throughout the bearing surfaces 311 of the leaf lip 211 and recess 212. As discussed below with reference to FIGS. 8A–8D, to reduce manufacturing costs, the leaf element 210 is preferably flat, whereas the recess 212 is typically curved, and some stress is introduced as the flat leaf element 210 is tensioned to conform to the recess 212. In a preferred embodiment, each leaf element 210 is less than two inches long and the perimeter of the upper ring 201 at the recess 212 is typically over 30 inches, and thus the stress induced by the bending of the leaf element 210 to conform to the recess 212 is minor. In a maximum load bearing embodiment, flats are introduced in the recess 212 to conform to the flat profile of the leaf lip 211, as illustrated in FIG. 8B and discussed further below.

Although the bearing surfaces 311 are illustrated as being significantly sloped, for ease of illustration, one of ordinary skill in the art will recognize that the bearing surfaces 311 should be substantially perpendicular to the lines of compression and expansion forces, the inclination being provided to ease the release of the leaf lip 211 from the recess 212. In a preferred embodiment, to provide a substantial bearing surface 311 while allowing for an ease of release of the leaf lip 211, the slopes of the bearing surfaces 311 is 15 degrees.

As is evident from the sequence of FIGS. 3A–3D, the connection of items via a separation connector 200 in accordance with this invention is a relatively simple press 300 and tension 321 process. In a typical staged assembly process, as illustrated for example in FIG. 4, each stage 401 is merely positioned above the prior stage 402 and lowered until the leaf lips 211 of the leaf elements 210 of the lower ring 202 are adjacent the recess 212 of the upper ring 201. The lowering or urging of the stage 401 into the lower ring 202 has the effect of increasing the perimeter formed by the leaf lips 211, due to the sloped perimeter 305 of the upper ring 201. If the filament 320 is placed about the perimeter before the stages are positioned, sufficient slack is provided to allow the perimeter of the leaf lips 211 to be expanded. When the leaf lips 211 are adjacent the recess 212, the perimeter of the leaf lips 211 is subsequently returned to its original diameter by a tensioning of the filament 320, typically via a ratchet or other tension retaining device.

Figure 5:
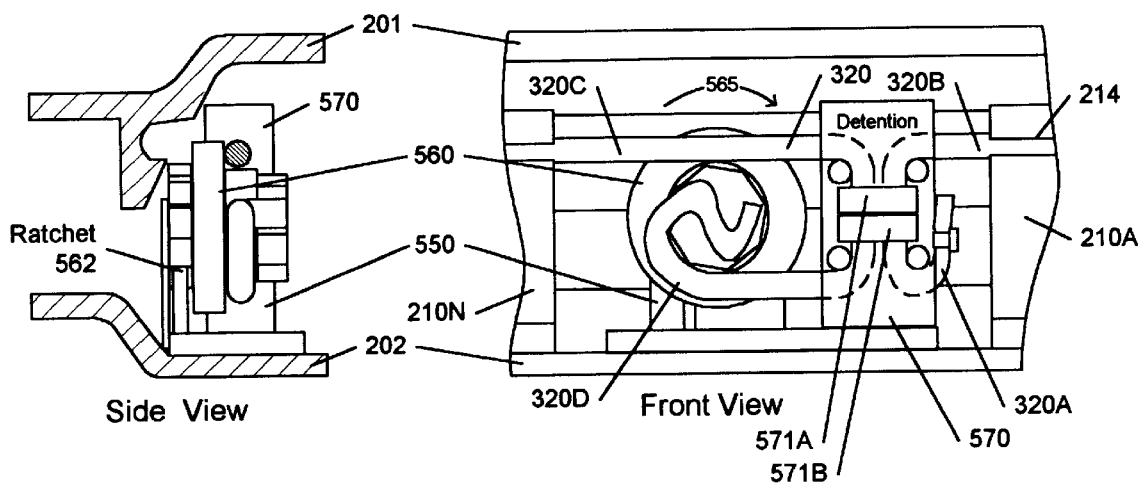
FIG. 5 illustrates an example tension and detension system in accordance with this invention.

Illustrated in FIG. 5 is an example tension device 550 and detension device 570 that are a mounted on the lower ring 202. In the example embodiment of FIG. 5, a free end 320A of the filament 320 is secured to the detension device 570 and, as illustrated by dashed lines, is routed 320A–320B through the detension device 570. Alternatively, the filament 320 may be a continuous loop that is sized to be slightly larger than the largest perimeter formed when the leaf lips 211 are deformed by the insertion of the upper loop 201, thereby obviating the need to secure it to the detension device 570. The filament 320 is routed about the perimeter formed by the leaf lips of leaf elements 210A–210N, where N symbolizes the total number of leaf elements 210. The filament groove 214 of at least one of the leaf elements 210A–210N is shaped so as to retain the filament 320 after it is detensioned. This retention also aids the routing 320B–320C of the filament 320 about the perimeter. The filament end 320D is routed through the detension device 570, as indicated by dashed lines, and secured to the tension device 550. If the filament 320 is continuous, the portion of the filament 320 that is adjacent the tension device 550 is secured to the tension device 550. A rotation of the tension wheel 560 in the direction 565 tensions the filament 320 about the perimeter formed by the leaf lips of leaf elements 210A–210N. In a preferred embodiment, the tension wheel 560 is ratcheted 562 to retain the tension. In a preferred embodiment, a 450 pound tension has been calculated to be sufficient to support an axial load of over 140,000 pounds and lateral moment over 825,000 inch-pounds using the aforementioned 38 inch diameter configuration of 59 leaf elements 210. In this configuration, the leaf elements 210 are made of aluminum alloy (6061-T6), approximately two inches tall, two inches wide, and less than a quarter inch thick. The leaf lip 211 and recess 212 are also less than a quarter inch in depth. The upper 201 and lower 202 rings are made of aluminum alloy (7075-T7).

The release of the connection between the upper 201 and lower 201 rings is effected by detensioning the filament 320. In a preferred embodiment, two redundant electric thermal line detensioners 571A, 571B heat the filament 320 to its melting point, or decomposition point, and redundantly detensions both ends 320A–B, 320C–D within 30 seconds. An example thermal line detensioner is detailed in U.S. Pat. No. 4,540,873, and is incorporated by reference herein. Depending upon the filament 320 material composition, the detensioning occurs as a result of filament 320 stretching or breaking, or both, at or near its melting or decomposition point. Alternative detensioning means, common in the art, can be used as well. For example, the tension wheel 360 may contain a clutch or latch that can be remotely released. In like manner, the tension device 550 may include an electric motor, that allows for remote tensioning as well as detensioning. Because the tension on the filament 320 is substantially less (about ⅛th) than the conventional V-band tension, and because the thermal detensioning process is a relatively slower process, the shock that is introduced by the de-tensioning of the filament 320 is substantially less than the shock that is introduced by the de-tensioning of the conventional V-band. The preferred use of a thermal line de-tensioner also avoids the shock effects and risk of potential injury typically associated with explosive de-tensioning means.

Figure 6:
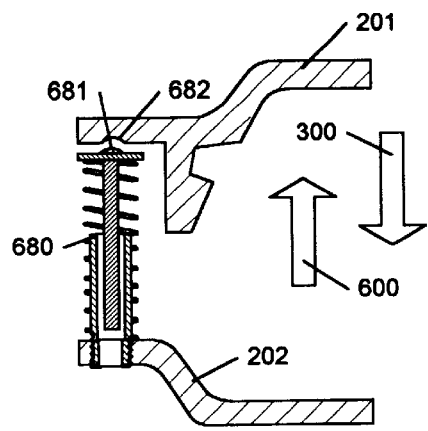
FIG. 6 illustrates an example spring mechanism for urging a separation of the separation connector in accordance with this invention.

When the filament 320 is detensioned, the leaf elements 210 are urged by the spring element 230 and plunger 231 to the deformed positions illustrated in FIGS. 3B and 3C. Ancillary devices are employed in a preferred embodiment to urge the upper ring from the lower ring. FIG. 6 illustrates an example spring device 680 that urges the upper ring 201 from the lower ring 202 in a direction 600. In a preferred embodiment, multiple springs 680 are affixed to the lower ring 202 to provide a uniform upward 600 urging force; the upper ring 201 is keyed to the lower ring 202, and a button 681 from each spring 680 seats the spring 680 into a corresponding recess 682 in the upper ring 201. Because the direction 600 is opposite to the direction 300, the sequence of operations illustrated in FIGS. 3C–3B–3A is retraced, thereby separating the upper 201 and lower 202 rings.

It is important to note that, as illustrated in FIG. 3B, the plunger 231 urges the leaf element 210 outward 310 such that a gap 375 exists between the farthest extent of the leaf lip 211 and the inclined surface 305 of the upper ring 201. In this manner, when the plunger 231 releases the coupling of the leaf elements 210 from the upper ring 201 by urging the leaf lip 211 from the recess 212, the leaf elements 210 are not obstructed by the upper ring 201. When the leaf lip 211 falls away, or is urged away, from the plunger 231 in a direction opposite direction 300 in FIG. 3A, the resilient force of the leaf element 310 against the inclined surface 305 of the upper ring 201 further urges the separation of the upper ring 201 from the lower ring 202 in the direction opposite to direction 300, resulting in the decoupled state illustrated in FIG. 2.

It is significant to note that upon separation, the primary components of the separation connector 200 remain intact; only the filament 320 is affected by the decoupling process. As mentioned above, in a preferred embodiment, one or more of the filament grooves 214 are formed so as to retain the filament 320 after it is detensioned. Because only the filament 320 is affected by the decoupling process, a separation connector in accordance with this invention allows for rapid and efficient coupling and decoupling during pre-launch test and assembly.

Figure 7A:
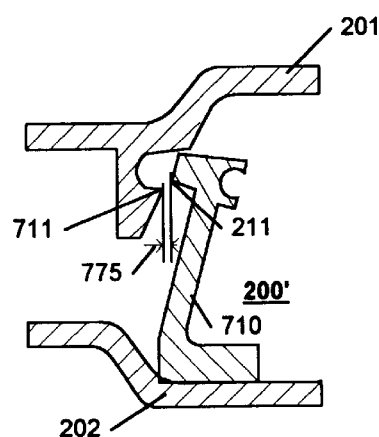
FIGS. 7A–7B illustrates an alternative example separation connector in accordance with this invention.
Figure 7B:
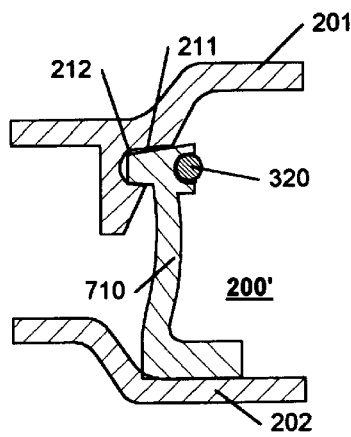

FIGS. 7A–7B illustrate an alternative embodiment of a separation connector 200'. Items having the same function as in prior figures are illustrated with the same reference numeral. In this alternative embodiment, the unbiased and unstressed position of the leaf element 710 is positioned such that a gap 775 exists between the leaf lip 211 and the farthest extent of the lower bearing surface 711 of the upper ring 201 when the leaf element 710 is in an unbiased position, as illustrated in FIG. 7A. As illustrated in FIG. 7B, the filament 320 in this embodiment is used to tension and deform the leaf element 710 so as to seat the leaf lip 211 of the leaf element 710 into the recess 212 of the upper ring 201. Note the example C-shaped filament groove 214 in FIG. 7B; the C-shape retains the filament after detensioning, as discussed above. In this embodiment, when the filament 320 is detensioned, the resilience of the leaf element 710 forces the leaf element 710 to its unbiased position shown in FIG. 7A, thereby releasing the upper ring 201 from the lower ring 202. As would be evident to one of ordinary skill in the art, the use of the resiliency of the leaf element 710 to urge the leaf lip 211 from the recess 212 obviates the need for the spring structures 230 of FIG. 2, but the reduced load bearing capabilities of the deformed and stressed leaf elements 710 of this embodiment limits its use to a reduced load, as compared to the substantially unstressed leaf elements 210 of FIG. 2.

The foregoing illustrates the principles of the invention. It will thus be appreciated that those skilled in the art will be able to devise various arrangements which, although not explicitly described or shown herein, embody the principles of the invention and are thus within its spirit and scope. The following alternative embodiments illustrate such varied arrangements.

As illustrated in FIG. 8A, the upper ring 201 is circular, whereas the leaf elements 210 are substantially flat elements arranged in a circular perimeter. The meeting of the flat surface 811 of the leaf element 210 and curved perimeter 812 of the recess 212 in the upper ring 201 provides contact only where the flat surface 811 is tangent 815 to the curved perimeter 812. This configuration introduces a stress on the leaf elements 210 to conform to the curved perimeter 812. Where maximum load bearing potential is required, flats 825 as in FIG. 8B are used. Alternatively (not shown), the leaf lips 211 may be formed as a curved surface to conform to a curved perimeter 812. In these embodiments, because the resiliency of the leaf element does not act to urge the leaf lip 211 out of the recess 212, greater strength springs 230 are required to urge the leaf lip 211 out of the recess 212. Each of these alternatives require a more complex manufacturing process.

In a preferred embodiment, as illustrated in FIG. 8C, the leaf element 810 contains cuts 818 that allow for a lower stress deformation of the leaf lip 211 to better conform to a curved perimeter when the filament 320 is circumferentially tensioned, as illustrated in FIG. 8D. This embodiment allows for the manufacture of a constant depth recess 212 in the upper ring 201 and a substantially flat leaf element 810; it also provides for a more uniform distribution of load within the recess 212. As illustrated in FIG. 8D, the tensioning of the filament (not shown) introduces a curvature to the leaf element 810, and the resiliency of the leaf element 810 will cause the leaf lip 211 to spring back to its original flat shape when the filament is detensioned, thereby acting to urge the extremities of the leaf lip 211 out of the recess 212. It should be noted that, in a preferred embodiment, the cuts 818 are shallow, and do not extend into upright portion 830 of the leaf element 810. In this manner, the leaf element 210 retains its lateral strength and integrity to support high lateral forces. FIG. 8C illustrates a top and front profile of a preferred embodiment of a leaf element 810 having relatively small cuts 818, as used in the aforementioned 59 leaf element, 38 inch diameter circular configuration. Also shown in FIG. 8C are end sections 816. In this embodiment, the filament grooves 214 are formed such that the filament 320 is retained by the "C" shape formed within each of these end sections 816. An "O" shape may also be used, but would require a threading of the filament through each "O".

Figure 9:
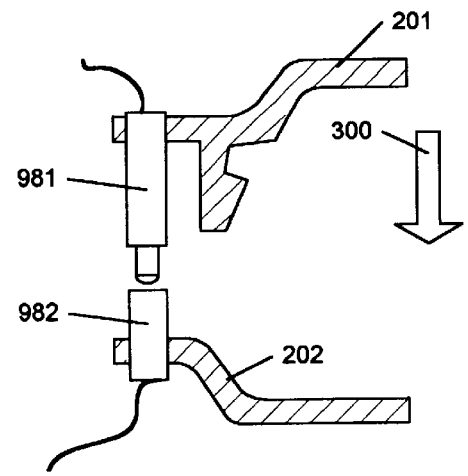
FIG. 9 illustrates an example electrical connector of a separation connector in accordance with this invention.

Typically, some electronic communication or power transmission is required between the connected items. FIG. 9 illustrates mating electrical connectors 981 and 982 that are attached to the upper 201 and lower 202 rings, respectively. As would be evident to one of ordinary skill in the art, the connectors 981 and 982 may contain multiple electrical connections, as required. Note that in accordance with this invention, the electrical mating of the connectors 981 and 982 is effected by the same downward force 300 that effects the aforementioned alignment of leaf lip 211 and recess 212.

In a preferred embodiment, the arrangement of leaf elements 210 conforms to a structural form of the joined items. In the aerospace industry, cylindrical shapes are common, and FIG. 2 illustrates a corresponding circular arrangement. In accordance with the principles of this invention, other arrangements are possible as well, as illustrated in FIGS. 10–10F. FIG. 10A illustrates an example square or rectangular arrangement; FIG. 10B illustrates an example open arrangement; FIG. 10C illustrates an example triangular arrangement, and so on. These arrangements will typically correspond somewhat to the shape of the shape of the items being joined. For example, the oval arrangement of FIG. 10D may be employed for connecting a wing of an aircraft to the fuselage, the oval shape corresponding somewhat to the profile of an airplane wing. The complex shape of FIG. 10E may be employed for a twin engine jet, such as used on an F-14 or F-15 aircraft. The example arrangement of FIG. 10F may be employed for six triangular shaped satellites that are mounted to a common launch vehicle. These and other configurations and shapes will be evident to one of ordinary skill in the art in light of the principles presented herein. It is important to note that the perimeter formed by the arrangement of leaf elements 210 should be curved, such that a tensioning of the filament 320 will effect an urging of the leaf lip 211 of each leaf element 210 into the recess 212 of the upper ring 201. In the conventional forms of FIG. 2, and FIGS. 10A–10D, the leaf lips 211 face the inside of the perimeter formed by the leaf element 210. As illustrated by the arrows 321 of FIG. 10A tensioning of the filament 320 about the perimeter has the effect of reducing the perimeter, forcing the leaf lips toward the center, and into the corresponding outward facing recess 212. If the orientation of the radius of curvature changes, the orientation of the leaf lips 211 and recess 212 should correspondingly change, as illustrated by the arrows 321 and 321' of FIG. 10E. That is, as illustrated in FIG. 10E, the leaf elements 210 are positioned such that a tensioning of the filament 320 has the effect of moving the leaf lips 211 in the directions 321 and 321' into corresponding recesses 212.

Figure 11:
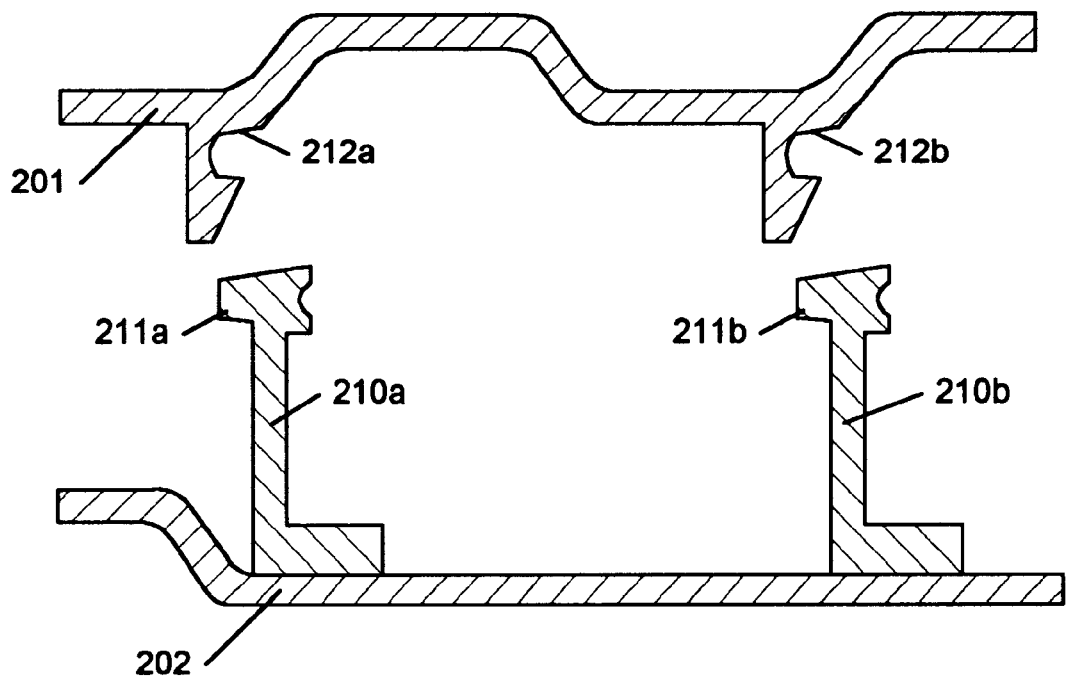
FIG. 11 illustrates an example dual separation connector in accordance with this invention.

As would be evident to one of ordinary skill in the art in light of this disclosure, the load bearing capacity of the separation connector may be increased by a variety of common mechanical design techniques. FIG. 11 illustrates, for example, a separation connector that contains dual rings of leaf elements 210a, 210b and leaf lips 211a, 211b on the lower ring 202, and corresponding dual recesses 212a and 212b in the upper ring 201.

A variety of other configurations and applications will also be evident in light of this disclosure. For example, the placement of the protrusion on the leaf lip 211 and the recess 212 in the upper ring 201 can be reversed, such that a protrusion from the upper ring 201 is seated into a recess on the leaf lip 211 by the filament 320. In like manner, multiple protrusions may be placed on each leaf lip 211, and multiple recesses 212 provided in the upper ring 201 to receive them. That is, in accordance with this invention, the upper ring 201 has a receiving surface that contains an inverse of the mating surface corresponding to the leaf lip 211 of each leaf element 210; preferred load bearing mating surface shapes are common in the mechanical arts.

In like manner, alternatives to the spring mechanisms 230 of FIG. 2, and 680 of FIG. 6 will be evident to one of ordinary skill in the art. A pre-cocked spring, for example, having a release mechanism that forces a sudden release of the plunger 231 may be preferred to provide an impact force on the leaf element 210 to overcome any binding that may occur between the leaf lip 211 and recess 212. The use of a pre-cocked spring also allows the seating of the leaf lip 211 into the recess 212 via the resilience of the leaf element 210, thereby eliminating the need for a tension filament 320 and its ancillary components in light load applications. An electromagnetic solenoid or hydraulic device may be used in lieu of the spring mechanisms 230 and/or 680 to provide an impact or continuous separation force via a piston. In like manner, although an embodiment without explosives is typically preferred, an impact force may be imparted by an explosive percussion device. Other urging means, such as leaf springs and the like, are also common in the art.

Figure 12:
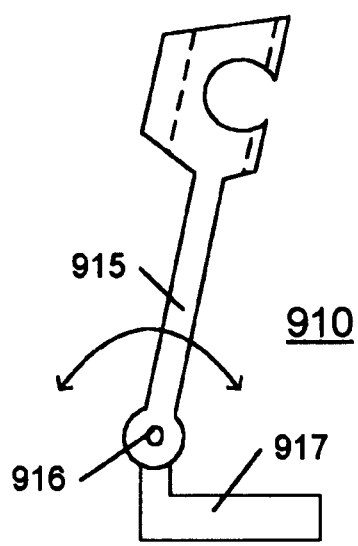
FIG. 12 illustrates an example hinged leaf element in accordance with this invention.

Note that although the leaf element 210 has been presented thus far as a single integral structure, alternative structures are feasible, including a multiple component leaf element. FIG. 12 illustrates, for example, a leaf element 910 having a leaf 915 and a base 917 connected by a hinge 916. This embodiment allows for the coupling and decoupling of two devices without inducing a deformation of the leaf element 910.

Although the separation connector 200 of this invention is particularly well suited for items that are expected to be uncoupled at some time, the ease of assembly of the separation connector 200 also warrants its use for applications that merely require a reliable and easy to assemble connection, such as assembling a pipeline. In these applications, for example, the requirements for the detensioning mechanism, if any, is minimal.

These and other configurations and structures will be evident to one of ordinary skill in the mechanical arts, and are included within the intended scope of the following claims.

I claim:

1. A separation connector assembly comprising:
   a first connector device comprising:
   a plurality of leaf elements, each leaf element of the plurality of leaf elements having a leaf lip that includes a first mating surface,
   a second connector device comprising:
     a receiving surface having a second mating surface substantially corresponding to an inverse of the first mating surface for receiving each leaf lip of the plurality of leaf elements,
     a band that is configured to form a perimeter about the plurality of leaf elements, and,
     a tensioning device that is configured to urge each leaf lip into the receiving surface, via a tensioning of the band, thereby facilitating a coupling of the first connector device to the second connector device.

2. The separation connector assembly of claim 1, wherein the first mating surface includes a protrusion and the second mating surface includes a recess.

3. The separation connector assembly of claim 1, wherein the first mating surface includes a recess and the second mating surface includes a protrusion.

4. The separation connector assembly of claim 1, wherein each leaf element has a resiliency, and
   the plurality of leaf elements is arranged on the first connector device such that the resiliency of each leaf element facilitates a decoupling of the first and second connector devices.

5. The separation connector assembly of claim 1, wherein:
   the plurality of leaf elements are arranged on the first connector device such that the leaf lips of the plurality of leaf elements form a first leaf lip perimeter,
   the receiving surface has a receiving perimeter having an inclined slope that deforms the plurality of leaf elements such that the leaf lips form a second leaf lip perimeter when the receiving perimeter is urged into the first leaf lip perimeter, and
   the band is configured to reform the first leaf lip perimeter.

6. The separation connector assembly of claim 1, further including
   a detensioning element that is configured to detension the band.

7. The separation connector assembly of claim 6, further including
   a means for urging the first connector device apart from the second connector device.

8. The separation connector assembly of claim 7, further including
   a means for coupling an electrical signal from the first connector device to the second connector device.

9. The separation connector assembly of claim 8, wherein
   the band includes at least one of monofilaments and polyfilaments of nylon, polyester, steel, inconel, titanium, and aluminum.

10. The separation connector assembly of claim 6, further including
    a tensioning device that tensions the band.

11. A separation connector assembly of claim 6, further comprising:
    one or more decoupling elements that are configured to urge each leaf lip away from the receiving surface, thereby decoupling the first connector device from the second connector device.

12. The separation connector assembly of claim 11, wherein
    the second connector device is radially stiffened by a step that forms an ancillary mounting surface, and
    the decoupling elements are affixed to the ancillary mounting surface.

13. The separation connector assembly of claim 11, wherein
    the decoupling elements include at least one of: a spring, a plunger, a piston, and a percussion device.

14. The separation connector assembly of claim 6, wherein
    the detensioning element is configured to sever the band.

15. The separation connector assembly of claim 14, wherein
    the detensioning element is configured to sever the band upon receipt of a command signal.

16. The separation connector assembly of claim 1, wherein
    at least one of the plurality of leaf elements is configured to retain the band.

17. The separation connector assembly of claim 1, wherein
at least one of the first connector device, the second connector device, and the plurality of leaf elements includes an aluminum alloy.

18. The separation connector assembly of claim 1, wherein
each leaf element includes a hinge to facilitate movement of the leaf lip into and away from the receiving surface.

19. The separation connector assembly of claim 1, further including
a tensioning device that tensions the band about the perimeter formed by the plurality of leaf elements.

20. The separation connector assembly of claim 1, wherein
the first connector device and the second connector device are configured such that, when the first connector device is coupled to the second connector device, the plurality of leaf elements is in a substantially unstressed state.

21. The separation connector assembly of claim 1, further including
a means for urging the first connector device apart from the second connector device.

22. The separation connector assembly of claim 21, wherein
the means for urging the first connector device apart from the second connector device includes at least one of: a spring, a plunger, a piston, and a percussion device.

23. The separation connector assembly of claim 21, wherein
the first connector device is radially stiffened by a step that forms an ancillary mounting surface, and
the means for urging the first connector device apart from the second connector device is affixed to the ancillary mounting surface.

24. A vehicle comprising:
a plurality of leaf elements, each leaf element of the plurality of leaf elements having a leaf lip that includes a mating surface that substantially corresponds to an inverse of a receiving surface on an other vehicle,
a band that is configured to urge each leaf lip of the plurality of leaf elements into the receiving surface, via a tensioning of the band, thereby fixedly adhering the vehicle to the other vehicle.

25. The vehicle of claim 24, further comprising:
a means for urging the vehicle away from the other vehicle.

26. The vehicle of claim 24, further comprising:
a detensioning device that is configured to detension the band.

27. The vehicle of claim 24, wherein
the plurality of leaf lips and the receiving surface are configured such that, when the vehicle is coupled to the other vehicle, the plurality of leaf elements is in a substantially unstressed state.

28. The vehicle of claim 24, wherein
each leaf element includes a hinge to facilitate movement of the leaf lip into and away from the receiving surface.

29. A vehicle comprising:
a receiving surface for receiving each leaf lip of a plurality of leaf elements on an other vehicle, and
decoupling elements that are configured to urge each leaf lip away from the receiving surface, thereby facilitating a decoupling of the vehicle from the other vehicle, characterized in that
the decoupling elements include at least one of: a spring, a plunger, a piston, and a percussion device.

30. A satellite system comprising:
a first vehicle,
a second vehicle,
a means for coupling the first vehicle to the second vehicle, and
a means for decoupling the first vehicle from the second vehicle;
wherein:
the first vehicle comprises a plurality of leaf elements, each leaf element of the plurality of leaf elements having a leaf lip that includes a mating surface that substantially corresponds to an inverse of a receiving surface on the second vehicle,
the means for coupling includes:
a band that is configured to urge each leaf lip of the plurality of leaf elements into the receiving surface, via a tensioning of the band, and
the means for decoupling includes decoupling elements that are configured to urge each leaf lip away from the receiving surface.

31. The satellite system of claim 30, wherein:
the plurality of leaf elements are arranged on the first vehicle such that the leaf lips of the plurality of leaf elements form a first leaf lip perimeter,
the second vehicle has a receiving perimeter about the receiving surface that has an inclined slope that deforms the plurality of leaf elements such that the leaf lips form a second leaf lip perimeter when the receiving perimeter of the second vehicle is urged into the first leaf lip perimeter, and
the tensioned band substantially reforms the first leaf lip perimeter.

32. The satellite system of claim 31, further including
a tensioning device that is configured to tension the band, and
a detensioning device that is configured to detension the band.

33. The satellite system of claim 30, further including
a means for communicating an electrical signal from the first vehicle to the second vehicle.

34. The satellite system of claim 30, wherein
the plurality of leaf lips and the receiving surface are configured such that, when the first vehicle is coupled to the second vehicle, the plurality of leaf elements is in a substantially unstressed state.

35. The satellite system of claim 30, wherein
each leaf element includes a hinge to facilitate movement of the leaf lip into and away from the receiving surface.

36. A method of attaching a first vehicle to a second vehicle, the first vehicle comprising a plurality of leaf elements, each leaf element of the plurality of leaf elements having a leaf lip that includes a mating surface that substantially corresponds to an inverse of a receiving surface on the second vehicle, the leaf lips of the plurality of leaf elements forming a first lip perimeter that substantially corresponds to an inclined receiving perimeter about the receiving surface on the second vehicle, the method comprising the steps of:
positioning the first vehicle and the second vehicle so as to align the first lip perimeter with the inclined receiving perimeter,
urging the first vehicle and the second vehicle together so as to deform the plurality of leaf elements via the inclined receiving perimeter to form a second lip perimeter that is larger than the first lip perimeter, and urging each of the leaf lips into the receiving surface via a tensioning of a band about a perimeter formed by the plurality of leaf elements, thereby substantially reforming the first lip perimeter.

37. A method of detaching a first vehicle from a second vehicle, the first vehicle comprising a plurality of leaf elements, each leaf element of the plurality of leaf elements having a leaf lip that is mated to a receiving surface on the second vehicle via a tensioned band about a perimeter formed by the plurality of leaf elements, the method comprising the steps of:

detensioning the tensioned band, urging each leaf lip of the plurality of leaf elements away from the receiving surface on the second vehicle, and urging the first vehicle and the second vehicle apart.

* * * * *